(12) United States Patent
Lee et al.

(10) Patent No.: US 7,539,412 B2
(45) Date of Patent: May 26, 2009

(54) CAMERA MODULE WITH FIRST AND SECOND IMAGE SENSOR CHIPS, HOLDERS AND LENS

(75) Inventors: Jong Hyun Lee, Cheongwon-shi (KR); Dong Seok Jeon, Cheongwon-shi (KR)

(73) Assignee: Terrasem Co. Ltd. (KR)

( * ) Notice: Subject to any disclaimer, the term of this patent is extended or adjusted under 35 U.S.C. 154(b) by 429 days.

(21) Appl. No.: 11/435,540

(22) Filed: May 17, 2006

(65) Prior Publication Data

US 2007/0269205 A1    Nov. 22, 2007

(51) Int. Cl.
*G03B 17/00*    (2006.01)
(52) U.S. Cl. ...................................... 396/542; 396/529
(58) Field of Classification Search ................ 396/526, 396/542, 529, 532, 533; 359/822, 829, 823; 348/373, 360
See application file for complete search history.

(56) References Cited

U.S. PATENT DOCUMENTS

| 6,898,030 | B1 * | 5/2005 | Lin et al. | 359/819 |
| 7,379,113 | B2 * | 5/2008 | Kong et al. | 348/340 |
| 7,422,382 | B2 * | 9/2008 | Seo | 396/529 |
| 7,484,901 | B2 * | 2/2009 | Seo et al. | 396/529 |
| 2008/0259201 | A1 * | 10/2008 | Iijima et al. | 348/345 |

* cited by examiner

*Primary Examiner*—Jay M Patidar
(74) *Attorney, Agent, or Firm*—Cantor Colburn LLP

(57) ABSTRACT

The present invention relates to a camera module and a manufacturing method thereof, in which both front and rear directions can be provided by improving the disadvantage of the existing camera module providing only one direction photographing. According to an embodiment of the present invention, the camera module includes first and second image sensor chips whose rear surfaces are adhered by a nonconductive bonding agent so that image region parts face opposite directions, a substrate that is connected to the first image sensor chip using bumps for signal connection and connected to the second image sensor chip using wires for signal connection, a through-hole being formed in the substrate under a region in which the first image sensor chip is mounted, an infrared-shielding filter installed in the through-hole of the substrate, first and second holders disposed on upper and lower sides of the substrate, and first and second lens disposed in the first and second holders, respectively.

1 Claim, 13 Drawing Sheets

CAMERA MODULE WITH FIRST AND SECOND IMAGE SENSOR CHIPS, HOLDERS AND LENS

BACKGROUND OF THE INVENTION

1. Field of the Invention

The present invention generally relates to a camera module and a manufacturing method thereof, and more particularly, to a camera module and a manufacturing method thereof, in which both front and rear direction photographing can be performed using one camera module and a double-sided image sensor chip can be fabricated by sawing two sheets of image sensor wafers in an adhesive state, thereby saving the manufacturing cost.

2. Background of the Related Art

In general, the related art camera module is a miniaturized camera structure mounted in mobile devices, etc. for photographing. An exemplary structure of the camera module is shown in FIG. 1.

FIG. 1 is a cross-sectional view of the camera module in the related art.

As shown in FIG. 1, the camera module includes an image sensor chip 12 mounted on a substrate 20 (a printed circuit board or a ceramic board). I/O terminals of the image sensor chip 12 are bonded to terminals of the substrate 20 through wires 14 so that signals of the image sensor chip 12 and the substrate 20 can be electrically connected. A holder 40 is disposed on the substrate 20 and a lens 50 is assembled with the holders 40. In FIG. 1, reference numeral 24 denotes a connector connected to the substrate 20.

FIGS. 2a to 2c are explanatory views illustrating a manufacturing method of the camera module in the related art.

FIG. 2a shows an image sensor wafer 10. The image sensor wafer 10 is divided into individual image sensor chips 12 through sawing.

FIG. 2b shows a state where the individual image sensor chips 12 are mounted on the substrate 20. After the image sensor chips 12 are adhered on the substrate 20, the I/O terminals of the image sensor chip 12 and the terminals of the substrate 20 are bonded using the gold wire 14.

Referring to FIG. 2c, the holder 40 is disposed on the substrate 20. The lens 50 is assembled with the holders 40, forming a camera module providing only one direction photographing. The holder 40 disposed on the substrate 20 is adhered to the substrate by means of a bonding agent 54. Furthermore, the lens 50 assembled with the holders 40 is focused along with the image sensor chip 12 and is fixed to the holders 40 as the bonding agent 52 for fixing the lens.

However, the related art camera module constructed above allows for only uni-directional photographing because one image sensor chip 12 and one lens 50 are included in one camera module. In order for the related art camera module to be used for mobile devices providing multi-directional photographing, several camera modules must be adhered to the mobile devices. This increases the camera module for multi-directional photograph.

Accordingly, there are problems in that the cost for the camera module is high and the size of a device becomes bulky since several camera modules must be used in order to provide multi-directional photographing.

SUMMARY OF THE INVENTION

Accordingly, the present invention has been made in view of the above problems occurring in the prior art, and it is an object of the present invention to provide a camera module and a manufacturing method thereof, in which both front and rear direction photographing can be performed using one camera module, thereby miniaturizing the device, and two sheets of image sensor wafers are adhered to form one double-sided image sensor chip, thereby saving the manufacturing cost.

To achieve the above object, a camera module according to an aspect of the present invention includes first and second image sensor chips whose rear surfaces are adhered by a nonconductive bonding agent so that image region parts face opposite directions, a substrate that is connected to the first image sensor chip using bumps for signal connection and connected to the second image sensor chip using wires for signal connection, a through-hole being formed in the substrate under a region in which the first image sensor chip is mounted, an infrared-shielding filter installed in the through-hole of the substrate, first and second holders disposed on upper and lower sides of the substrate, and first and second lens disposed in the first and second holders, respectively.

Furthermore, a method of manufacturing a camera module according to another aspect of the present invention includes the steps of preparing two sheets of image sensor wafers; forming pumps for signal connection on one of the prepared image sensor wafers; adhering the two sheets of the image sensor wafers using a nonconductive bonding agent so that rear surfaces of the two image sensor wafers face opposite directions; adhering a protection film on a surface of the image sensor wafer on which the bumps are not formed, of the two sheets of the image sensor wafers; separating the two image sensor wafers into individual image sensor chips through sawing so that image region parts face opposite directions, rear surfaces of the image sensor chips being adhered using a nonconductive bonding agent; providing a substrate on which the individual image sensor chips are mounted and in which a through-hole is formed in a region in which the image sensor chips are mounted; mounting the image sensor chip on which the bumps are formed on the substrate with the image sensor chip being placed on a lower side, whereby electrical signals of the image sensor chip on which the bumps are formed and electrical signals of the substrate are connected by the bumps; stripping a protection film adhered on the image sensor chip, and adhering an infrared-shielding filter on a bottom surface of the through-hole formed in the substrate; bonding the image sensor chip, which is adhered in an opposite direction to the image sensor chip on which the bumps for signal connection are formed, and the substrate using wires for electrical signal; and disposing holders on upper and lower sides of the substrate and assembling lens with each holder.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

The present invention will now be described in detail in connection with specific embodiments with reference to the accompanying drawings.

Figure 1:
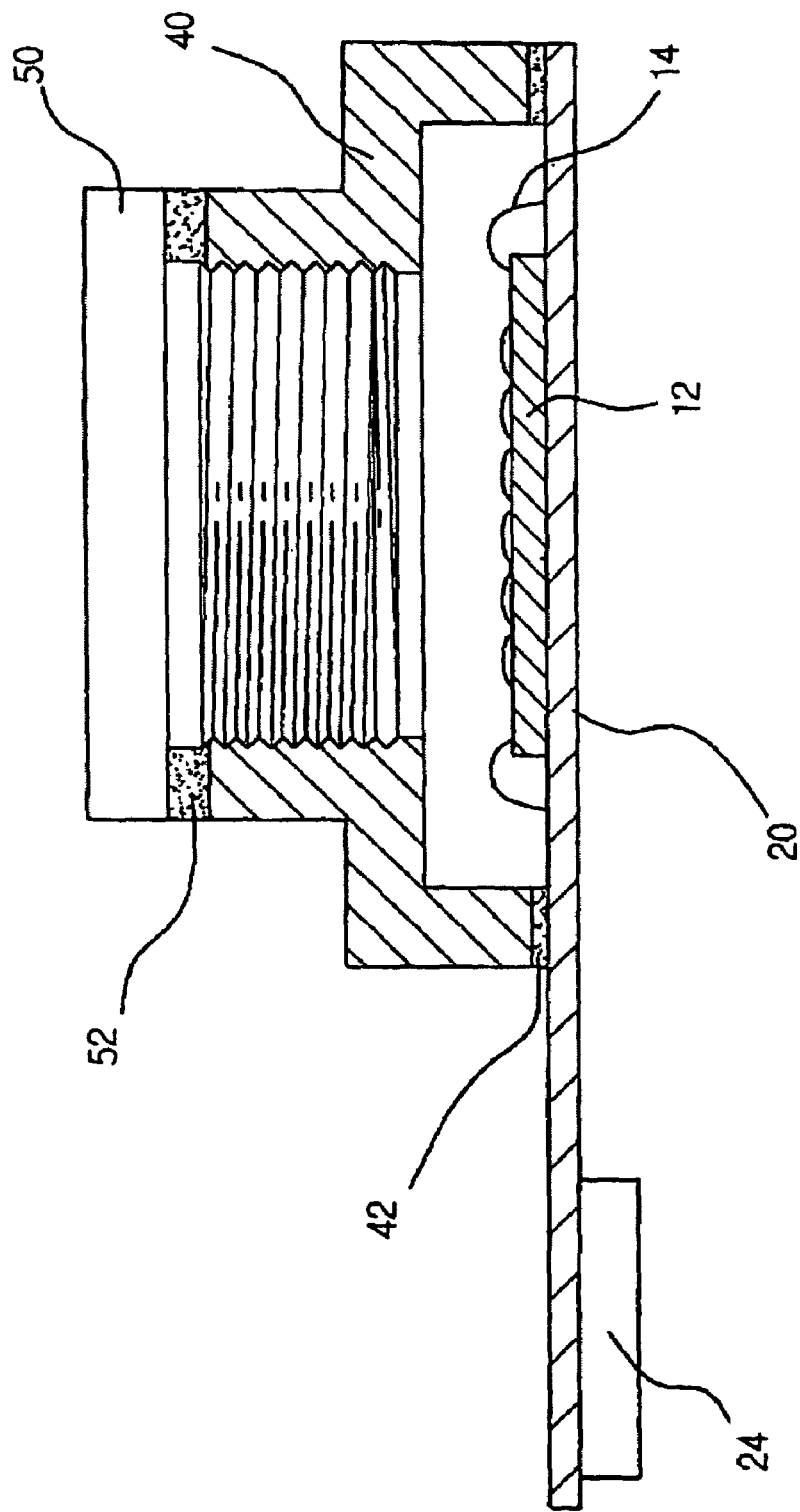
FIG. 1 is a cross-sectional view of a camera module in the related art.
Figure 2A:
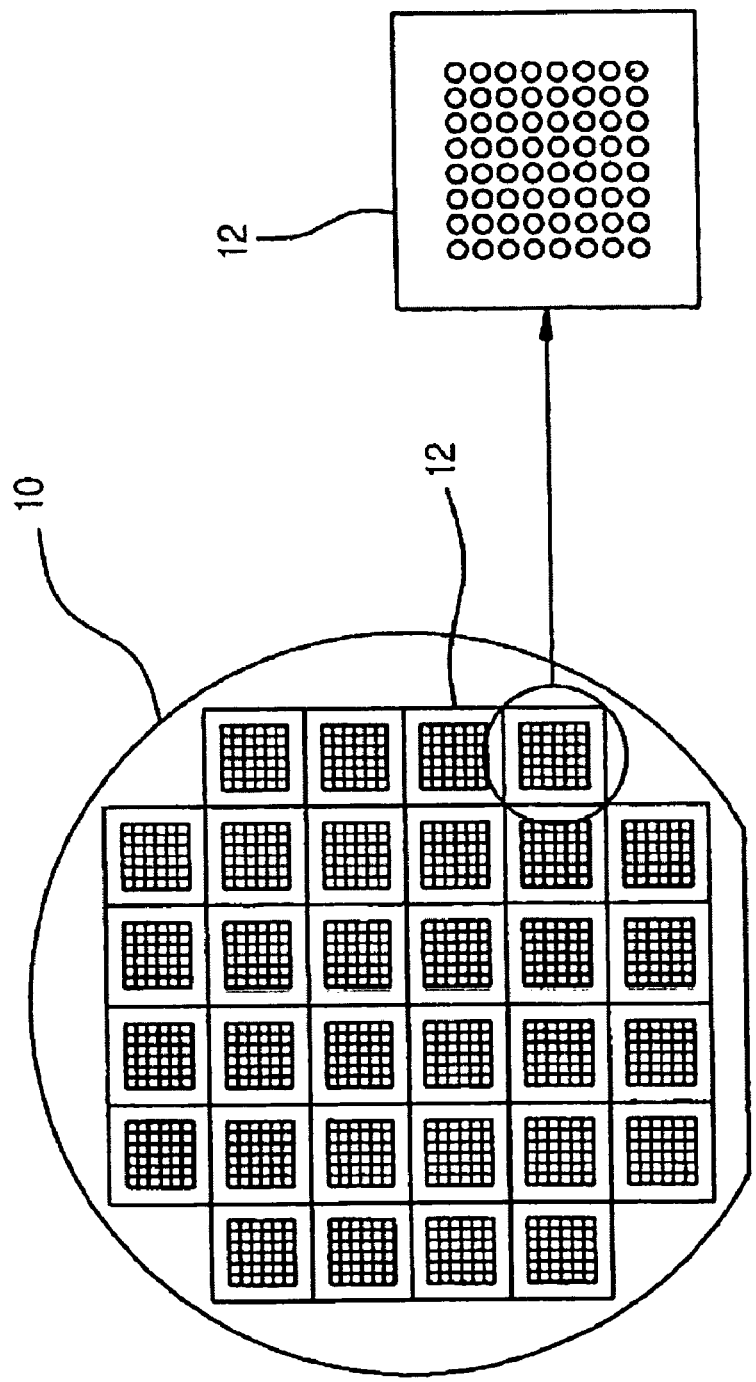
FIGS. 2a to 2c are explanatory views illustrating a manufacturing method of the camera module in the related art.
Figure 2B:
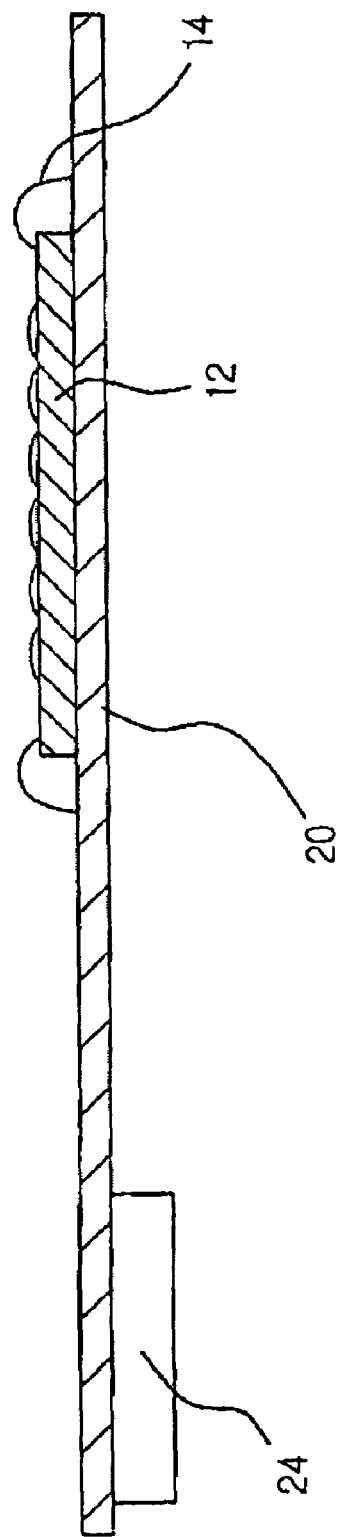
Figure 2C:
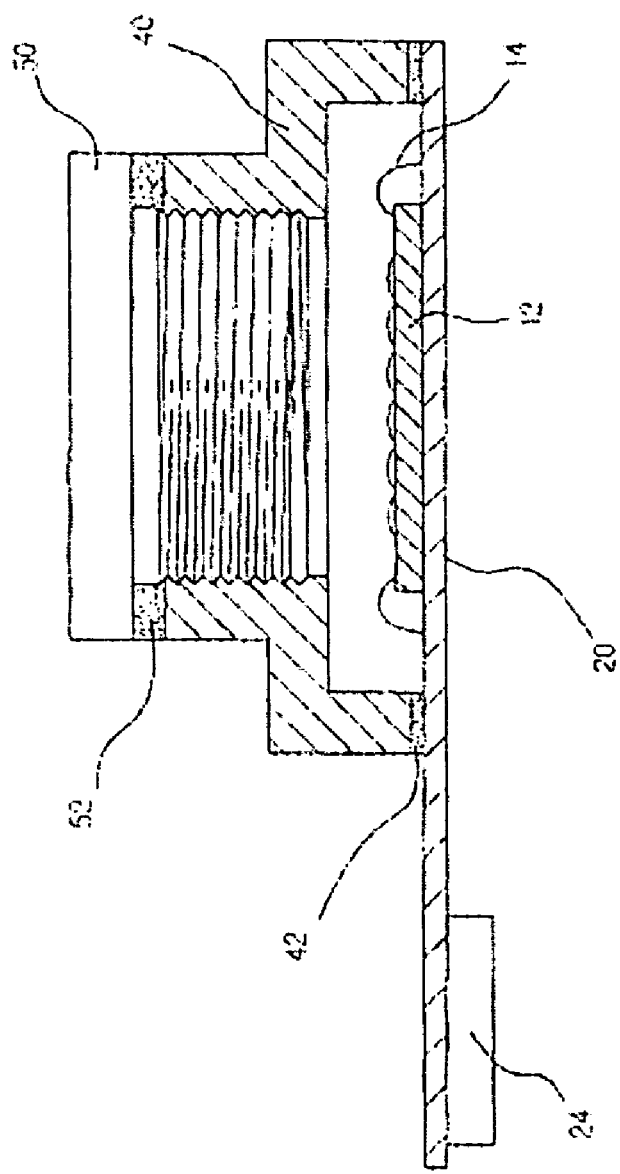
Figure 3:
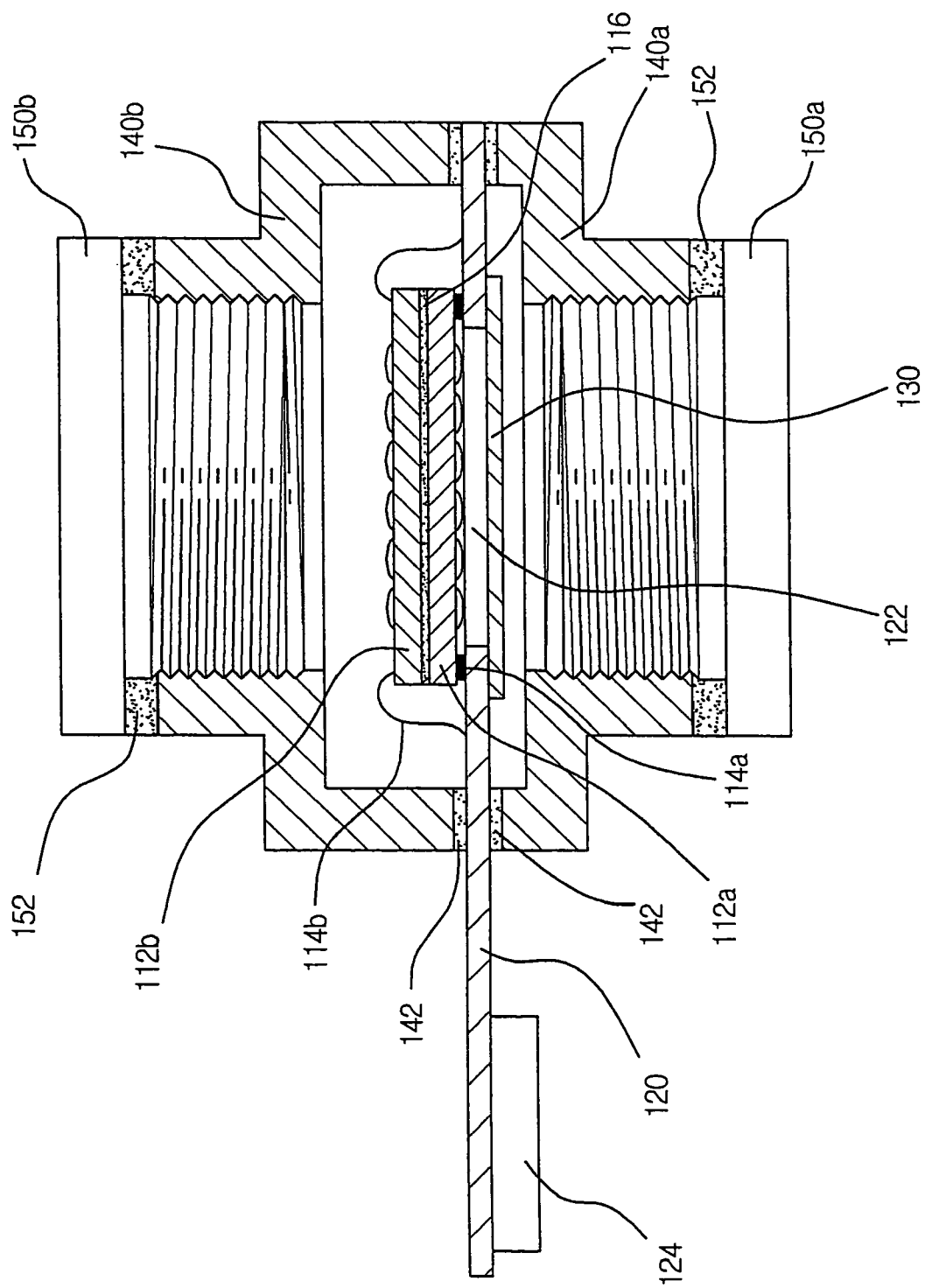
FIG. 3 is a cross-sectional view of a camera module according to an embodiment of the present invention.

FIG. 3 is a cross-sectional view of a camera module according to an embodiment of the present invention.

Referring to FIG. 3, respective rear surfaces include first and second image sensor chips 112a, 112b that are adhered using a nonconductive bonding agent 116 such that image region parts made of a microlens face opposite directions.

For example, to connect electrical signals, the first image sensor chip 112a may be connected to a bump 114a and the second image sensor chip 112b may be connected to a substrate 120 through wires 114b.

A through-hole 122 is formed in the substrate 120 under a region in which the first image sensor chip 112a is mounted. In the through-hole 122 is installed an infrared-shielding filter 130.

Furthermore, first and second holders 140a, 140b are disposed on upper and lower sides of the substrate 120. First and second lens 150a, 150b are assembled with the first and second holders 140a, 140b, thereby forming a camera module providing bi-directional photographing according to an embodiment of the present invention.

In this case, the first and second holders 140a, 140b are adhered to the substrate 120 using a bonding agent 142. The lens 150a, 150b assembled with the holders 140a, 140b are focused from the image regions of the image sensor chips 112a, 112b and are then fixed to the first and second holders using the bonding agent 152. In FIG. 3, reference numeral 124 denotes a connector connected to the substrate 120.

FIGS. 4a to 4h are explanatory views illustrating a method of manufacturing the camera module according to an embodiment of the present invention.

Figure 4A:
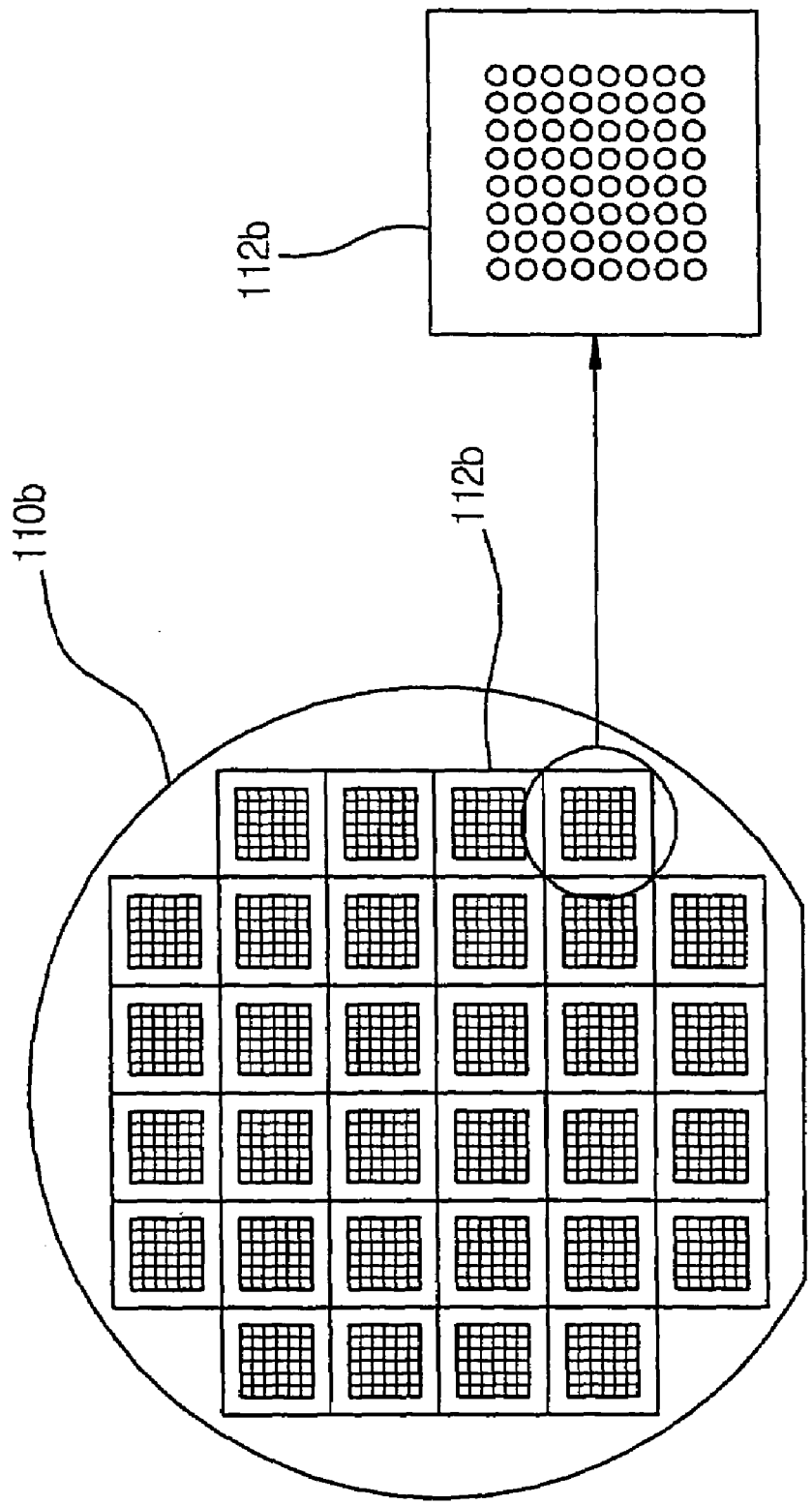
FIGS. 4a to 4h are explanatory views illustrating a method of manufacturing the camera module according to an embodiment of the present invention.
Figure 4B:
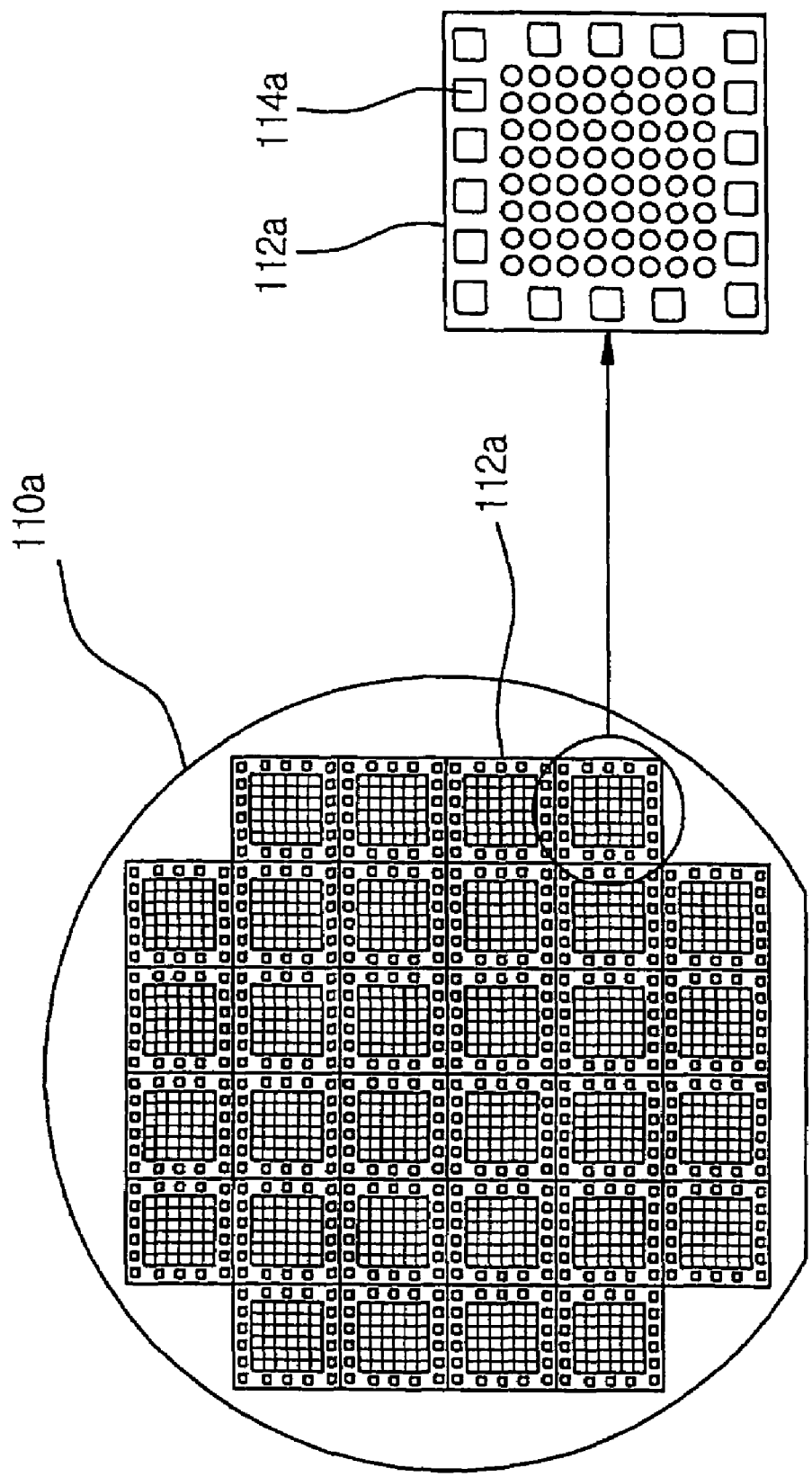
Figure 4C:
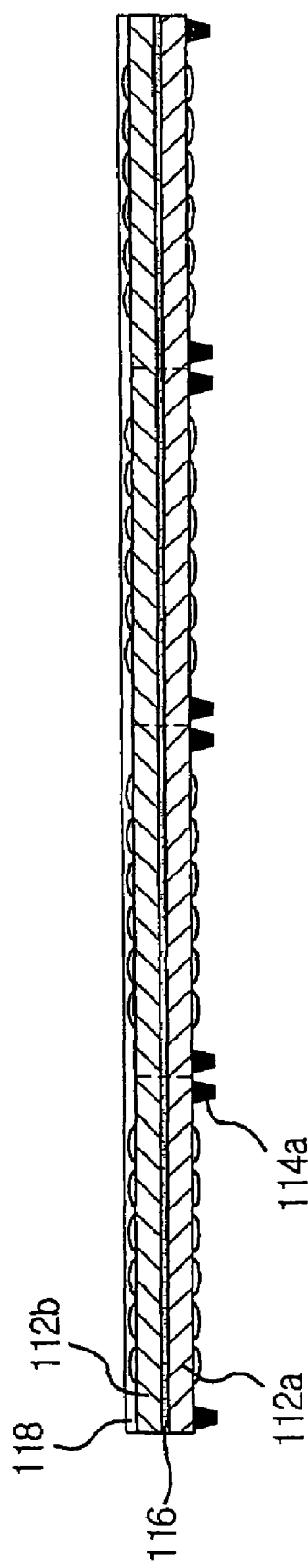

In the method of manufacturing the camera module according to an embodiment of the present invention, as shown in FIGS. 4a and 4b, two sheets of image sensor wafers 110a, 110b are respectively prepared. The pumps 114a for signal connection are formed on the image sensor wafer 110a of the prepared image sensor wafers 110a, 110b, as shown in FIG. 4b. Rear surfaces of the two sheets of the image sensor wafers 110a, 110b are then adhered using the nonconductive bonding agent 116, as shown in FIG. 4c.

Figure 4D:
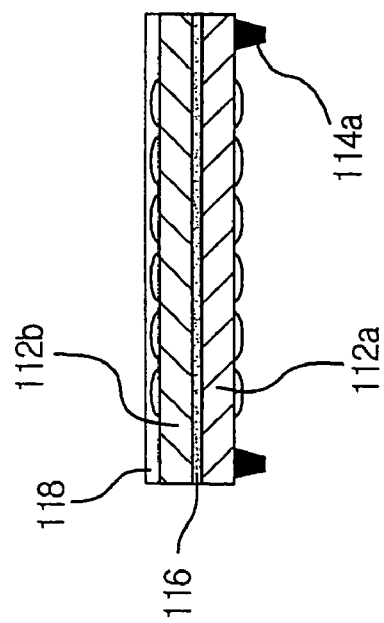

A protection film 118 is adhered on a surface of the image sensor wafer 110b on which the bumps 114a have not been formed, of the two sheets of the adhered image sensor wafers 110a, 110b. The resulting image sensor wafers 110a, 110b are divided into individual image sensor chips 112a, 112b whose rear surfaces are adhered by the nonconductive bonding agent 116 so that the image region parts face opposite directions, as shown in FIG. 4d.

Figure 4E:
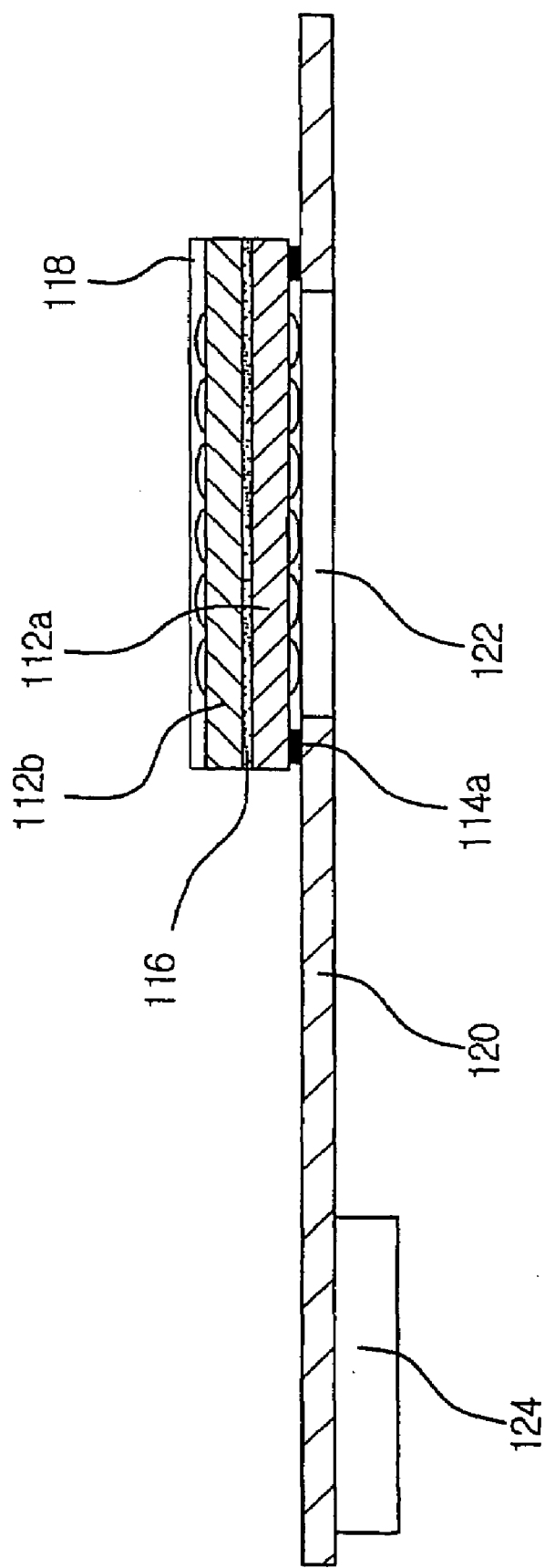

As shown in FIG. 4e, the individual image sensor chips 112a, 112b are mounted on the substrate 120. At this time, the through-hole 122 is formed in the substrate 120 under the region in which the image sensor chips 112a, 112b are mounted. The image sensor chip 112a is mounted on the substrate 120 so that the bumps 114a are connected to the substrate 120 in such a manner that the image sensor chip 112a is placed on a lower side.

Furthermore, the image sensor chip 112a on which the bumps 114a are formed is connected to the substrate 120. That is, the image sensor chip 112a on which the bumps 114a are formed is connected to the substrate 120 using a Chip On Film (COF).

Figure 4F:
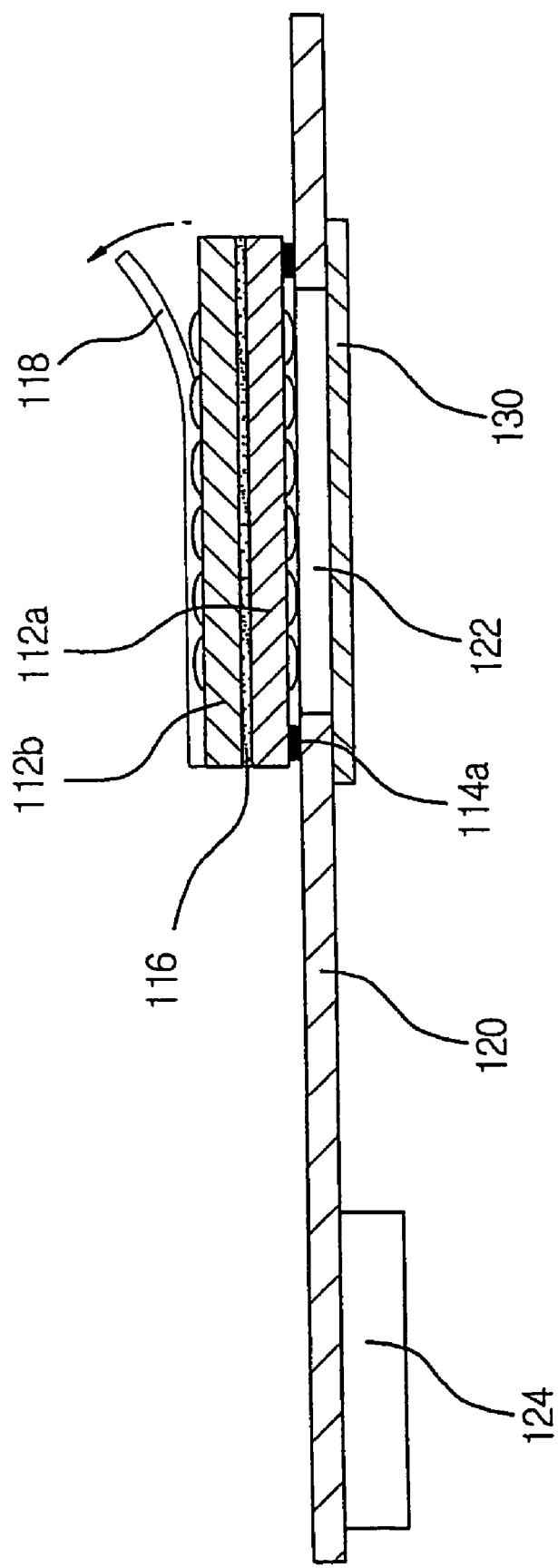

Referring to FIG. 4f, the protection film 118 adhered to the image sensor chip 112b is stripped. The infrared-shielding filter 130 is adhered on a bottom surface of the through-hole 122 formed in the substrate 120.

Figure 4G:
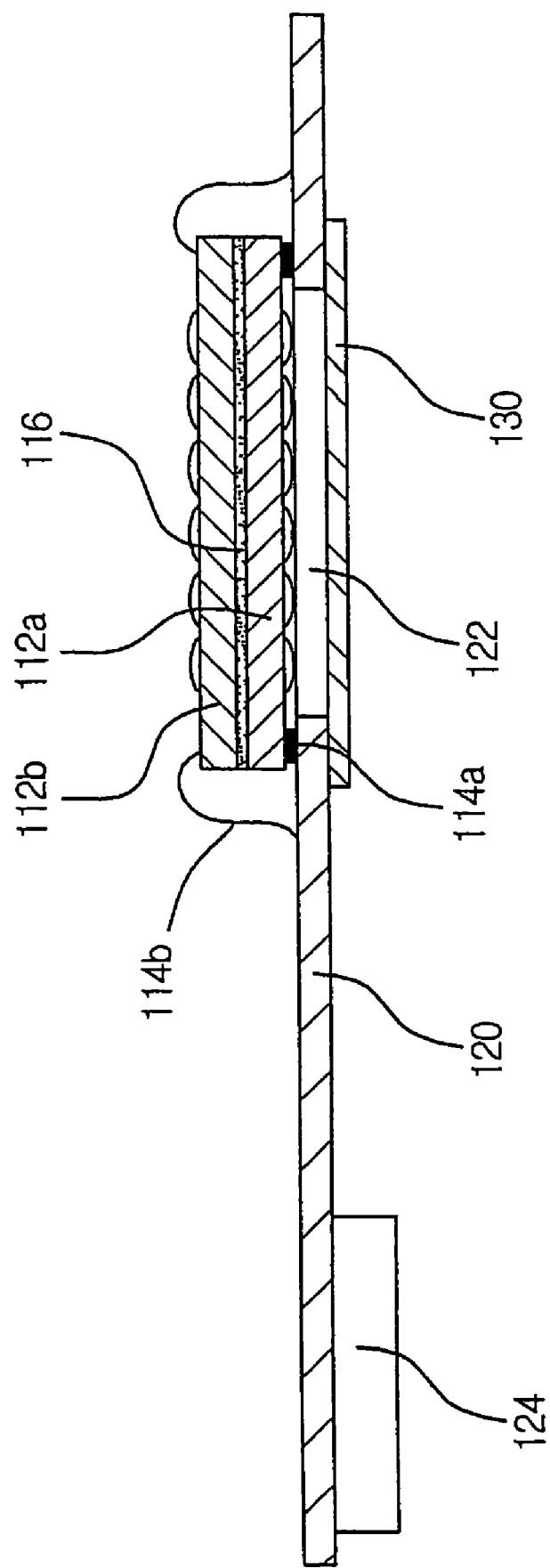

Referring to FIG. 4g, the image sensor chip 112b, which is adhered in an opposite direction to the image sensor chip. 112a on which the bumps 114a are formed, is bonded to the substrate 120 using the wires 114b.

Figure 4H:
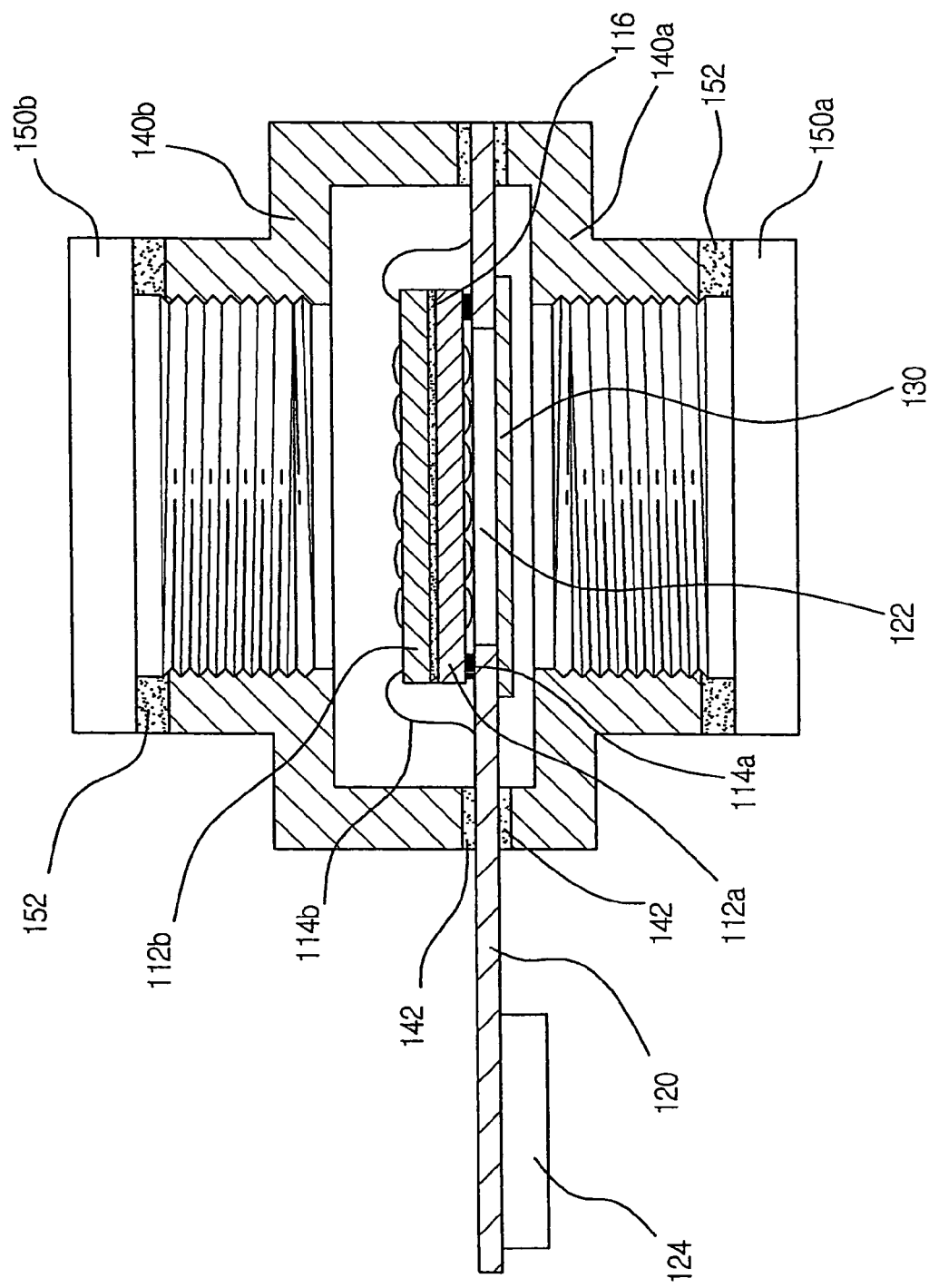

Referring to FIG. 4h, the holders 140a, 140b are disposed on upper and lower sides of the substrate 120, respectively. The lens 150a, 150b are assembled with the holders 140a, 140b, respectively, forming a camera module providing bi-directional photographing according to an embodiment of the present invention.

In accordance with the camera module fabricated by the manufacturing method according to the present invention, both front and rear direction photographing is possible using one camera module. Accordingly, devices in which the camera module is installed can be miniaturized. Furthermore, two sheets of image sensor wafers are adhered in opposite directions to form a new double-sided image sensor wafer. It is therefore possible to simplify the manufacturing cost and save the cost accordingly.

As described above, according to the present invention, both front and rear direction photographing can be performed using one camera module. It is therefore possible to miniaturize devices. Furthermore, to fabricate a double-sided image sensor chip, two sheets of image sensor wafers are adhered to form one new image sensor wafer. It is therefore possible to save the manufacturing cost.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A camera module, comprising:
   first and second image sensor chips whose rear surfaces are adhered by a nonconductive bonding agent so that image region parts face opposite directions;
   a substrate that is connected to the first image sensor chip using bumps for signal connection and connected to the second image sensor chip using wires for signal connection, a through-hole being formed in the substrate under a region in which the first image sensor chip is mounted;
   an infrared-shielding filter installed in the through-hole of the substrate;
   first and second holders disposed on upper and lower sides of the substrate; and
   first and second lens disposed in the first and second holders, respectively.

* * * * *